United States Patent [19]

Lin et al.

[11] Patent Number: 4,943,077
[45] Date of Patent: Jul. 24, 1990

[54] ENCLOSED SINGLE-AXLE DRIVING MECHANISM FOR BICYCLES

[75] Inventors: Chuan-Sheng Lin; Wei Lii, both of Taichung, Taiwan

[73] Assignee: Yu-Fu Traffic Supplier Ltd., Co., Taichung, Taiwan

[21] Appl. No.: 273,041

[22] Filed: Nov. 18, 1988

[51] Int. Cl.$^5$ .............................. B62M 1/06
[52] U.S. Cl. .................................. 280/260
[58] Field of Search ....................... 280/260

[56] References Cited

U.S. PATENT DOCUMENTS

| | | | |
|---|---|---|---|
| 632,306 | 9/1899 | Bryant | 280/260 |
| 666,548 | 1/1901 | Parker | 280/260 |
| 3,861,715 | 1/1975 | Mendoza | 280/260 |

FOREIGN PATENT DOCUMENTS 2178709  2/1987  United Kingdom ............ 280/260

Primary Examiner—Mitchell J. Hill
Attorney, Agent, or Firm—Bacon & Thomas

[57] ABSTRACT

An enclosed single-axle driving mechanism for bicycles to replace the traditional chain drive system, comprised of one pair of spiral driving gears and one pair of spiral driven gears for power transmission, to let the pedaling force be transmitted through a driving spindle to drive the axle of the free-wheel to rotate, so as to minimize space requirement and maximize the security.

9 Claims, 4 Drawing Sheets

ENCLOSED SINGLE-AXLE DRIVING MECHANISM FOR BICYCLES

BACKGROUND OF THE INVENTION

Bicycle is a tool to help the people to move faster by wheels and is an important turning point in the history of vehicles to improve the efficiency of "walking". From the original multi-wheel to the present double-wheel, the revolution of driving mechanism is the most important change in the improvement of performance. From the original direct pedaling to directly drive the driving wheel, through the chain drive system to turn the chain wheel and the rear hub sprocket, to the recent multi-gear type "variable speed drive", improvement on driving mechanism has been continuously pushing out. Therefore, cycle chain is acting a very important role in the history of the revolution of bicycles. Recently, there is another design of rack mechanism link motion used for the driving mechanism of a bicycle. However, this design is not practical, because it requires repeatedly the operation of "vertical pedaling" with the feet which is not in conformity with physical dynamics. Therefore, this design can not enjoy general popularity.

As we all know, the chain drive bicycles may still have some drawbacks remain unsettled as described hereunder.

1. Space occupation: The cycle chain which is to engage with the chain wheel and the rear hub sprocket of the driving wheel takes a big space to install at one lateral side. Therefore, the gravity of the bicycle is inclined toward the side where the cycle chain is engaged and, the outer appearance of the bicycle is not balanceably designed.

2. Less security: Since the cycle chain is to engage with the gear wheels, while running at higher speed, the chain links are repeatedly driven to leave from one tooth to engage with the other. While riding, the bottom of the rider's pants may be easy to swing and to thrust into the gear to be engaged with the cycle chain to abruptly stop the driving and to further cause the rider to get hurt in a fall. It is believed that every bicycle rider has experienced feet being stained or hurt by the cycle chain while riding 3. Complicated structure: In order to protect the chain from exposing, a chain guard is required. And in order to fix the chain guard fastening means must be provided. Therefore, the chain driving mechanism requires relatively more complicated structure which becomes more difficult to operate, assemble and maintain, and is easy to break down.

4. Chain dropping: Looseness of the tension of cycle chain, or displacement of engaging position due to excessive driving speed, or thrust of external substances may cause the chain to drop to further cause the bicycle lose control or capsize. Since the body of the bicycle is very light, it is very dangerous while riding at high speed.

5. Since the cycle chain is exposed outside, it is easily damaged or the lubrication is easily dried to deteriorate the perfomance of the cycle chain. Therefore, constant lubricating is required In case the chain wheel or the rear hub sprocket is damaged or offset, stable engagement will be unable to achieve. Further, the tension of the chain must be kept within a limited range to let the chain work properly. Attaching a chain guard to entirely enclose the cycle chain to prevent of the former problem from happening (as used in earlier traditional bicycles), it will increase the cost, complicate the assembly procedures, and cause chain trouble (cycle chain scrapes the chain guard).

SUMMARY OF THE INVENTION

The present invention relates to an enclosed single-axle driving mechanism for bicycles, which comprises one pair of spiral driving gears mounted on the bottom bracket bearing axle, and one pair of spiral driven gears arranged at the free-wheel hub, wherein the pedaling force is transmitted through a driving spindle to a single driving axle to further drive the free-wheel to rotate so as to drive the bicycle run forward without a chain drive system.

The main object of the present invention is related to an enclosed single-axle driving mechanism for bicycles wherein a single and enclosed driving axle is provided to drive the free-wheel to rotate, which prevents the driving mechanism from being exposed, minimizes space requiremet and maximizes the security.

Another object of the present invention is to provide an enclosed single-axle driving mechanism for bicycles wherein the driving mechanism is comprised of one pair of vertically engaged spiral driving gears and one pair of vertically engaged spiral driven gears with a driving spindle connected therebetween to further drive a driving axle to turn the free-wheel to rotate, which prevents the chain dropping problem, provides maximum stability and durability.

Another object of the present invention is to provide an enclosed single-axle driving mechanism for bicycles wherein the driving axle is directly set in a tube of a gear case without additional arrangement of chain guard, to simplify the assembly and facilitate the production in the most economic way.

A yet further object of the present invention is to an enclosed single-axle driving mechanism for bicycles wherein the driving force from the front driving gears is transmitted to the rear driven gears through a driving spindle which is set in a round protective tube. The round protective tube may be symmetrically arranged at both sides to balance the configuration.

The above and other objects, features and advantages of the present invention will be fully understood from the following description considered in connection with the accompanying drawings which illustrate the best mode for practicing the present invention.

DETAILED DESCRIPTION OF THE PREFERRED EMBODIMENT

Figure 1:
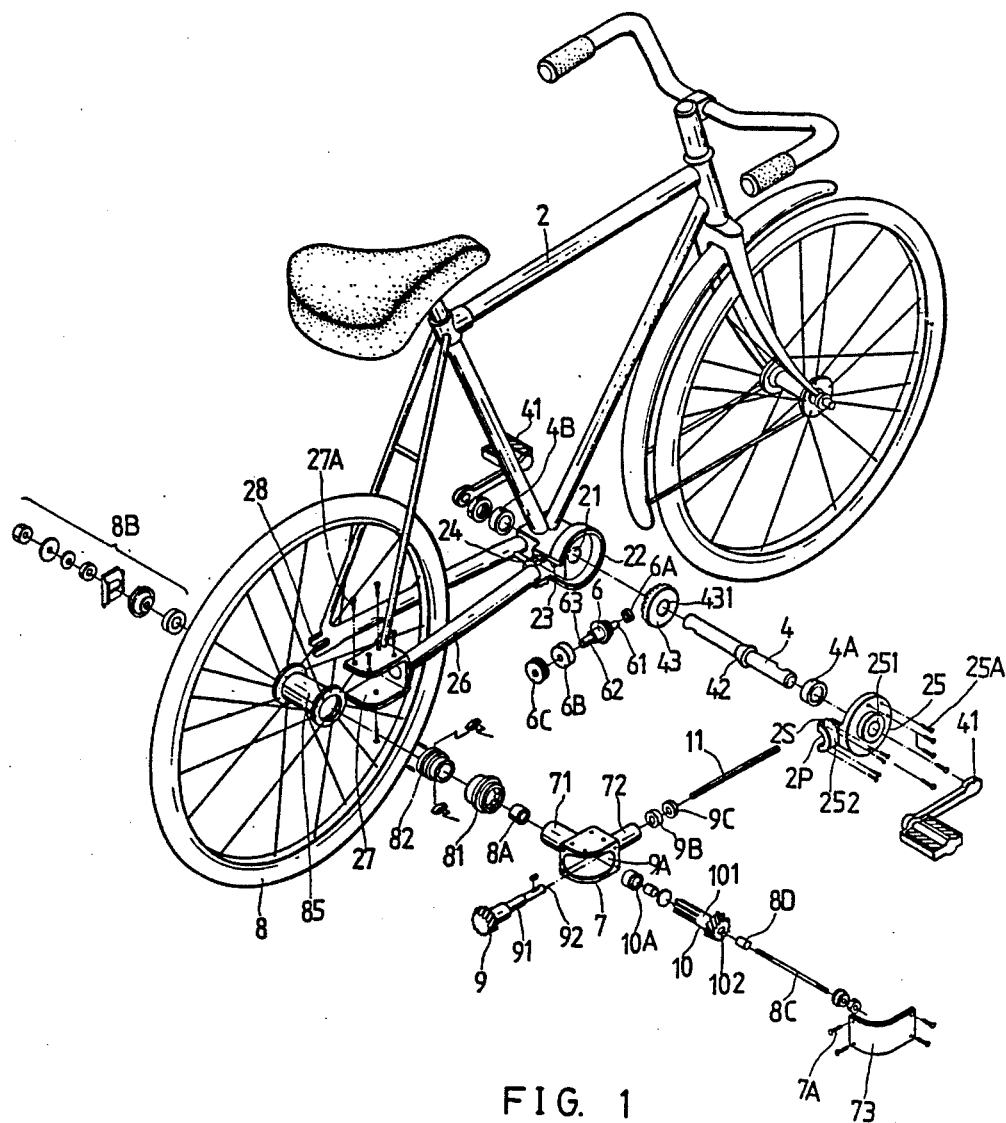
FIG. 1 is a perspective partially exploded view of the present invention.
Figure 2:
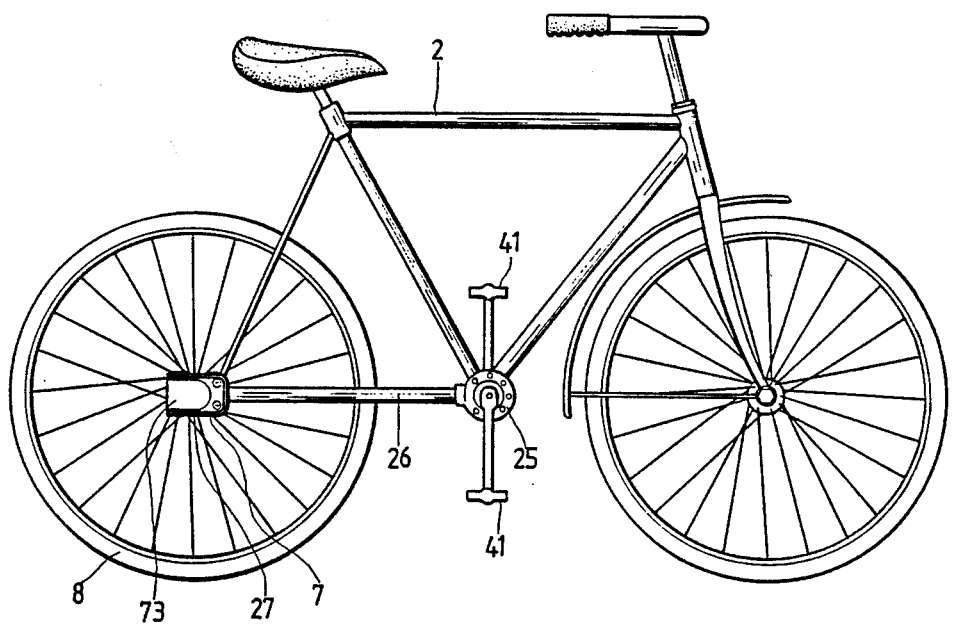
FIG. 2 is a side view of a bicycle embodying the present invention.
Figure 3:
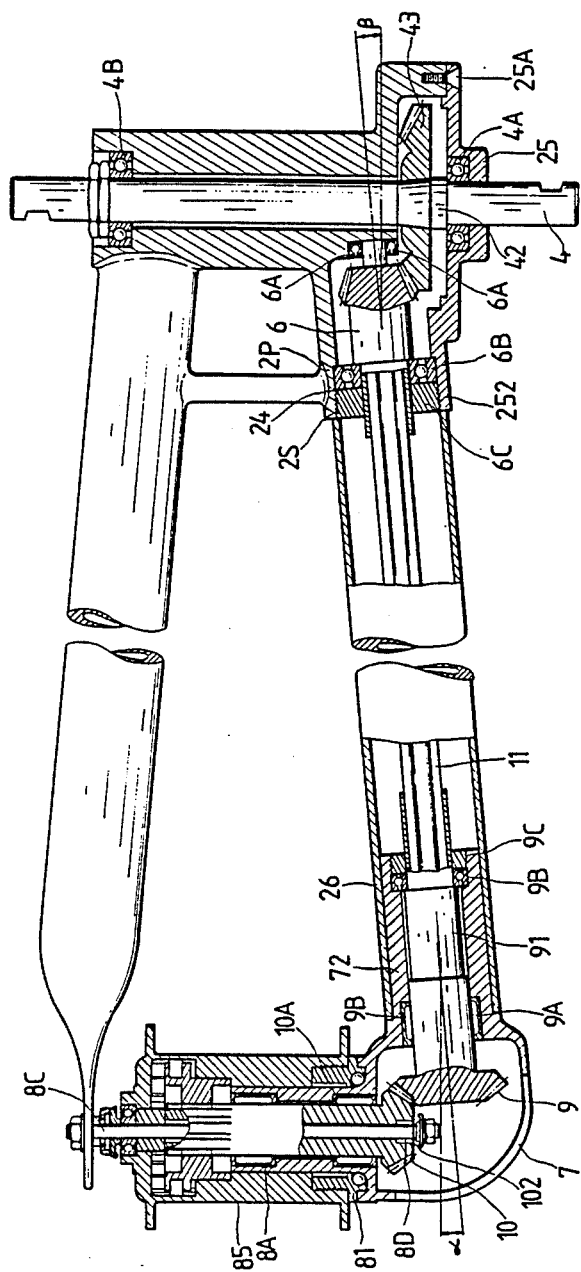
FIG. 3 is a partial top view, partially broken away from the present invention.

Referring to FIGS. 1, 2 and 3, a bicycle frame (2) is respectively connected with front wheel steering system, saddle, rear wheel (8). The present invention is concerned with the rear wheel driving mechanism, of which the structure includes the various component parts as described hereunder.

A bicycle frame (2) comprises a bottom bracket axial hole (21) for a bottom bracket bearing axle (4) to set therein to further let the bottom bracket bearing axle (4) be connected with a crank (41) respectively at both ends. A main drive gear case (22) is made at the outer side of the axial hole (21) to protrude therebeyond. A taper bush (42) is set in the middle portion of the bottom bracket bearing axle (4) to match with the taper slot (431) of a spiral driving gear (43) so as to let the spiral driving gear (43) be firmly attached to the bottom bracket bearing axle (4). When the driving axle (4) is set in the axial hole (21), the spiral driving gear (43) is mounted on the bottom bracket bearing axle (4) arranged inside the gear case (22), and the both ends of the bottom bracket bearing axle (4) are protruding outward for fixation of respective bearings (4A) (4B) to further be connected with respective cranks (41) and bicycle pedals for the rider to pedal and to drive the parachute type spiral driving gear (43) to rotate.

The said gear case is arranged to provide a cutting at the rear side to let the spiral driving gear (43) be exposed thereto. A hole (23) is made at the central portion of the said cutting, and a half bearing block (24) is made at the outer side of the hole (23). A side cover plate (25) which comprises a central axial hole (251) for insertion of the said bottom bracket bearing axle (4) and a half bearing block (252) to match with the said half bearing block (24) is provided to cover the said gear case (22) by means of locking bolts (25A) so as to allocate the said driving axle (4) and to form a complete bearing block. Said half bearing block (252) comprises a spiral flute (25) made therein for arrangement of an auxiliary spiral driving gear (6) to set therein. The said auxiliary spiral driving gear (6) comprises a protruding axle (61) at the front mounted with a bearing (6A) for inserting into the hole (23). The auxiliary spiral driving gear (6) also comprises a stepped axle (62) at the rear end. The front end of the rear step of the stepped axle (62) is mounted with a bearing (6B) to set in the half bearing block (24) at the front position. The rear end of the rear step of the stepped axle (62) is mounted with a bush (6C) having an outer thread made thereto to match with the spiral flute (241) of the half bearing block (24) for revolving and tension adujstment so as to set the auxiliary gear (6) in the accurate position (the said bush (6C) comprises side hole for a regulator pin to insert therein to make adjustment). When assembling, the auxiliary gear (6) is to be set in advance. After the auxiliary gear (6) is well set, the spiral driving gear (43) mounted bottom bracket bearing axle (4) is set in the axial hole (21) to let the auxiliary gear (6) be properly engaged with the spiral driving gear (43), and the side cover plate (25) is fixedly attached thereto to let the both ends of the bottom bracket bearing axle (4) be respectively connected with the cranks (41) and to let the half bearing block (252) be connected with the half bearing block (24) so as to let the bearing (6B) and the bush (6C) be firmly set therein and to let the spiral driving gear (43) be driven by the bottom bracket bearing axle (4) to carry the auxiliary spiral driving gear (6) to rotate and to provide driving output. Further, the auxiliary gear (6) is also arranged to provide a polygonal axle hole (63) at the rear end. A protective tube (26) is provided to connect with the rear end of the half bearing block (24) at one end, which comprises a U-shaped locating frame (27) at the other end to be further connected with one of the seat stays of the bicycle frame (2) at one lateral side, wherein the U-shaped locating frame (27) is symmetrically arranged to match with the U-shaed bracket hole (28) of the other seat stay of the bicycle frame (2) at the other lateral side.

Figure 4:
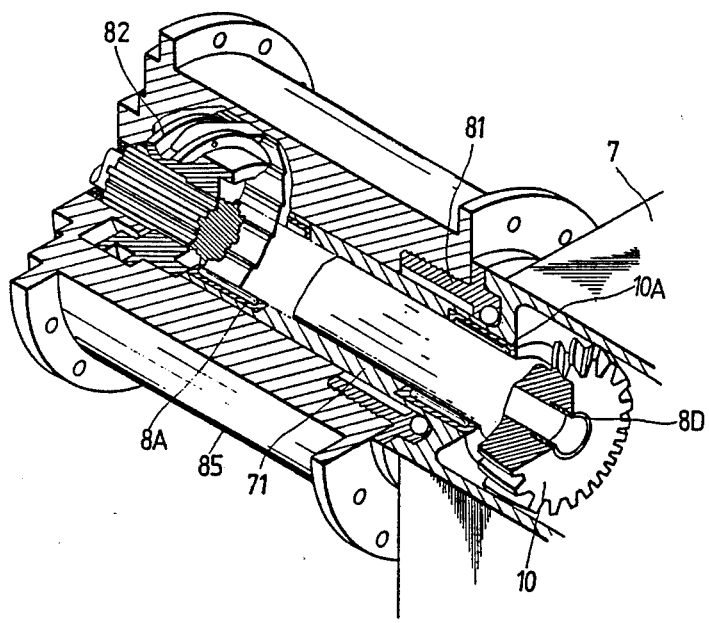
FIG. 4 is a partial perspective sectional view of the driven gear set of the present invention.

A L-shaped gear case (7) is arranged to provide tubes (71) (72) at two adjacent sides. The tube (71) is to be inserted into a hub bearing (81) to further connect to the free-wheel hub (85). The said hub bearing (81) is further connected with the free-wheel (8), free-wheel hub (85), one way ratchet washer (82), bearing (8A), locking nuts and washers (8B) and the axle (8C). These said wheel hub locating elements have same structure as the conventional ones and are not within the area to be claimed The said gear case (7) is also arranged to provide an opening at the other two adjacent sides against the tubes (71) (72) for a spiral driven gear (9) to set therein. The said spiral driven gear (9) comprises a stepped axle (91) with a bearing (9A) mounted thereon to insert into the tube (72) to further be mounted with a bearing (9B) and a bush (9C). The said bush (9C) is arranged to provide an outer thread to match with the inner thread of the tube (72) for forward or backward position change of the spiral driven gear (9) through revolving adjustment. An auxiliary spiral driven gear (10) is arranged to provide a gear shaft (101) mounted with a bearing (10A) to further set in the tube (71) to engage with the spiral driven gear (9). A central axle (8C) and a bearing (8D) are provided to penetrate through the auxiliary gear (10) via the axial hole (102) to further be movably connected with the free-wheel hub elements of the free-wheel (8) and to let the teeth of the gear shaft (101) of the auxiliary gear (10) be inserted into the one-way ratchet bush (82) to engage with the ratchet bush (82) together. Therefore, the clockwise revolving of the auxiliary gear (10) will drive the free-wheel (8) to run ahead and, the counter-clockwise revolving of the auxiliary gear (10) will become idle rotation (as shown in FIG. 4). Further, a side cover plate (73) is provided to cover the opening of the gear case (7) by means of bolts (7A) at the time the gear case (7) is set in the U-shaped locating frame (27) and fastened to the locating frame (27) by bolts (27A) and further attached to the free-wheel hub (85) of the free-wheel (8) with the bearing (8A) of the axle (8C) mounted on the U-shaped bracket hole (28). When the driven gear set is properly arranged, the tube (72) is inserted into the protective tube (26) to let the polygonal axle hole (92) of the spiral driven gear (9) be aimed at the polygonal axle hole (63) of the auxiliary driving gear (6) for a prolonged polygonal driving spindle (11) to set therebetween, such that the revolution of the front driving gear set (43) (6) guides the driven gear set (9) (10) to drive the free-wheel (8) to make one-way forwarding rotation (by means of the action of the said one-way ratchet bush (82).)

By means of said arrangement, the spiral driving gear (43) receives the pedaling force from the bottom bracket bearing axle (4) to engage with the auxiliary driving gear (6) to turn the polygonal driving spindle (11) to further carry the spiral driven gear (9) to rotate so as to further let the spiral driven gear (9) engage with the auxiliary driven gear (1) to make synchronous movement to further match with the one-way ratchet means of the free-wheel (8) to let the free-wheel to run forward (as shown in FIG. 3).

For preferred speed performance, the number of teeth of the gears may be arranged according to labor-saving or high speed requirements.

Due to variable size of the seat stays of the bicycle frame (2), the protective tube (26) and the driving spindle (11) may be inclined upward at the rear end. However, this problem can be easily resolved by reducing the contained angle among the teeth of the spiral driving gear set (43) (6) and the teeth of the spiral driven gear set (9)(10) (according to investigation, the inclined angle is about 4-5° or less 10°; i.e. the contained angle between the main gear and the auxiliary gear of the said driving and driven gear sets may be arranged within 85-86° to prevent from happening of said problem.)

In general, the present invention is to provide such an enclosed single-axle driving mechanism for bicycles, having numerous features each of which tends to makes the structure more practical and utilitarian as well as durable in use and inexpensive to manufacture.

What is claimed is:

1. An enclosed single axle driving mechanism for a bicycle having rotary pedal cranks rotatably attached to a frame comprising:
    (a) a driving spindle;
    (b) driving means connecting the pedal cranks to the driving spindle such that rotation of the pedal cranks causes rotation of the driving spindle;
    (c) a wheel hub;
    (d) driven means connecting the driving spindle to the wheel hub such that rotation of the driving spindle causes rotation of the wheel hub, the driven means comprising:
        (i) a gear case;
        (ii) a first driven gear;
        (iii) means connecting the first driven gear to the driving spindle such that the position of the first driven gear may be axially adjustable with respect to the driving spindle;
        (iv) an auxiliary driven gear rotatably mounted in the gear case so as to engage the first driven gear;
        (v) mounting means rotatably mounting the first driven gear to the gear case such that the first driven gear is axially adjustable to enable the engagement between the first and auxiliary driven gears to be adjusted; and,
        (vi) means connecting the auxiliary driven gear to the wheel hub; and,
    (e) attaching means to removably attach the gear case to the frame such that the gear case, and the first and auxiliary driven gears may be attached and removed as a unit.

2. The driving mechanism according to claim 1 wherein the mounting means comprises:
    (a) a tube extending from the gear case defining a threaded portion;
    (b) an axle extending from the first driven gear;
    (c) bearing means to rotatably support the shaft in the tube;
    (d) a bushing mounted on the shaft and threadingly engaging the threaded portion of the tube such that rotation of the bushing axially adjusts the position of the first driven gear.

3. The driving mechanism according to claim 2 wherein the means connecting the driving spindle and the first driven gear comprises:
    (a) a polygonal cross-section defined by a portion of the driving spindle; and,
    (b) a recess defined by the first driving gear axle having a cross-sectional shape corresponding to that of the polygonal driving spindle so as to slidably accept that portion of the driving spindle.

4. The driving mechanism according to claim 3 wherein the first and auxiliary driven gears are spiral gears.

5. The driving mechanism according to claim 1 wherein the drive means comprises:
    (a) A first driving gear connected to the pedal cranks and rotatably supported on the frame;
    (b) an auxiliary driving gear rotatably attached to the frame and drivingly engaging the first driving gear; and,
    (c) means connecting the auxiliary driving gear to the driving spindle.

6. The driving mechanism according to claim 5 further comprising second mounting means attaching the auxiliary driving gear to the frame such that the auxiliary driving gear is adjustable along its axis of rotation to enable the engagement between the first and auxiliary driving gears to be adjusted.

7. The driving mechanism according to claim 6 wherein the second mounting means comprises:
    (a) a bearing block defining a threaded portion;
    (b) an axle extending from the auxiliary driving gear and rotatably supported in the bearing block; and,
    (c) a threaded bushing mounted on the shaft and threadingly engaging the threaded portion of the bearing block.

8. The driving mechanism according to claim 7 wherein the means connecting the driving spindle and the auxiliary driving gear comprises:
    (a) a polygonal cross-section defined by a portion of the driving spindle; and,
    (b) a recess defined by the auxiliary driving gear having a cross-sectional shape corresponding to that of the polygonal driving spindle so as to slidably accept that portion of the driving spindle.

9. The driving mechanism according to claim 8 wherein the first and auxiliary driving gears are spiral gears.

* * * * *